United States Patent
Redana et al.

(10) Patent No.: US 9,179,326 B2
(45) Date of Patent: Nov. 3, 2015

(54) METHOD FOR PROVIDING THE IDENTITY OF AN APPARATUS IN A COMMUNICATIONS NETWORK AND APPARATUS THEREOF

(75) Inventors: Simone Redana, Munich (DE); Richard Waldhauser, Munich (DE); Isman Bazar, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 253 days.

(21) Appl. No.: 13/877,953

(22) PCT Filed: Oct. 7, 2010

(86) PCT No.: PCT/EP2010/065018
§ 371 (c)(1), (2), (4) Date: Oct. 4, 2013

(87) PCT Pub. No.: WO2012/045359
PCT Pub. Date: Apr. 12, 2012

(65) Prior Publication Data
US 2014/0024306 A1    Jan. 23, 2014

(51) Int. Cl.
*H04W 16/26*  (2009.01)
*H04B 7/26*   (2006.01)
*H04W 8/26*   (2009.01)
*H04W 84/04*  (2009.01)
*H04W 92/20*  (2009.01)

(52) U.S. Cl.
CPC ............ *H04W 16/26* (2013.01); *H04B 7/2606* (2013.01); *H04W 8/26* (2013.01); *H04W 84/047* (2013.01); *H04W 92/20* (2013.01)

(58) Field of Classification Search
CPC .................................................. H04W 16/26
See application file for complete search history.

(56) References Cited

U.S. PATENT DOCUMENTS

| | | | |
|---|---|---|---|
| 2011/0028181 A1* | 2/2011 | Byun et al. | 455/525 |
| 2011/0237258 A1* | 9/2011 | Nylander et al. | 455/437 |
| 2012/0190368 A1* | 7/2012 | Zhang et al. | 455/436 |
| 2013/0044639 A1* | 2/2013 | Wang et al. | 370/254 |
| 2013/0070663 A1* | 3/2013 | Gunnarsson et al. | 370/315 |
| 2013/0165123 A1* | 6/2013 | Takahashi | 455/436 |
| 2013/0215820 A1* | 8/2013 | Redana et al. | 370/315 |
| 2013/0229946 A1* | 9/2013 | Wang et al. | 370/254 |
| 2014/0187244 A1* | 7/2014 | Masini et al. | 455/436 |

FOREIGN PATENT DOCUMENTS

| | | |
|---|---|---|
| WO | WO 2009/157124 A1 | 12/2009 |
| WO | WO 2010/006649 A1 | 1/2010 |
| WO | WO 2010/010402 A1 | 1/2010 |

OTHER PUBLICATIONS

3GPP TSG RAN WG1 #56, Athens, Greece, Feb. 9-13, 2009, R1-090593, "On the design of relay node for LTE-advanced", Texas Instruments, 11 pgs.

* cited by examiner

*Primary Examiner* — Bobbak Safaipour
(74) *Attorney, Agent, or Firm* — Harrington & Smith

(57) ABSTRACT

The invention relates to an access node in a communications network that is adapted for providing an identifier for a relay node including receiver means arranged to receive a message from the relay node, the message requesting an establishment of an interface over a communication link, checking means arranged to check data fields included in the message received, generating means arranged to generate the identifier, and transmitting means arranged to transmit the generated identifier to the relay node over the interface connection of communication link.

16 Claims, 2 Drawing Sheets

METHOD FOR PROVIDING THE IDENTITY OF AN APPARATUS IN A COMMUNICATIONS NETWORK AND APPARATUS THEREOF

FIELD OF THE INVENTION

The present invention relates to the technical field of mobile telecommunication networks. In particular, the present invention relates to a method for providing the identity of an apparatus within a relay enhanced mobile telecommunication network when an apparatus connects to the network. Further, the present invention relates to an apparatus which is adapted to carry out the mentioned method.

SUMMARY OF THE INVENTION

In order to allow for cost efficient and flexible deployment solutions, within the third generation partnership project (3GPP) relaying is investigated as one of the new technologies for Long Term Evolution (LTE) networks and in particular for Long Term Evolution Advanced (LTE-A) networks. It has been shown that with the usage of Relay Nodes (RN) the spatial coverage and/or the capacity of a base station (BS) or of an eNodeB (eNB) can be significantly increased. Further, areas can be covered which without using RN would suffer from bad radio conditions. Such areas are located typically at the edge of a cell being served by a particular BS.

Apart from this main goal of coverage extension, introducing relay concepts can also help in (a) providing a high-bit-rate coverage in high shadowing environments, (b) reducing average radio-transmission power at a user equipment (UE), thereby leading to long battery life, (c) enhancing the cell capacity and effective throughput, e.g., increasing cell-edge capacity and balancing cell load and (d) enhancing the overall performance and deployment cost of a Radio Access Network (RAN).

There are many kinds of relay systems proposed starting from the simplest amplify/forward RN, which is applied e.g. in single frequency Digital Video Broadcasting-Handhelds (DVB-H) networks ending up to the most complex one, which utilizes a network coding to improve the overall performance. The most common type of RN that is proposed for use of RN in mobile networks (also known as cellular relaying) is a detect/forward type of RN, where an input signal is detected and retransmitted using the same procedure as in the original transmission. Relaying can be realized at the different layers of a protocol stack, which layers are described by the well known Open Systems Interconnection Reference Model (OSI model). A simple amplify and forward relaying can be realized at the Layer 1 of the protocol stack where the RN is required to have only (some part of) the PHY layer. Layer 2 RNs, which include the protocol stack up to the Media Access Control (MAC)/Radio Link Control (RLC) layers, enable the possibility of doing decentralized radio resource management. Layer 3 (L3) or higher layer RNs, also known as Type 1 RN or self-backhauling RN, can be considered by a UE as wireless base stations and support all the protocol layers of normal base stations. That is, a L3 RN is required to have all the essential LTE release 8 eNB cell parameters and to broadcast them so that it can be recognized as a normal eNB cell by UEs.

Different interfaces have been defined for RNs, the link between DeNB (Donor-eNB) and RN is the backhaul link and the interface is called the Un interface. The link between the RN and UE is called the access link and the interface is called the Uu interface which is compatible with release 8/9 Uu between eNB and UE. In Type 1 RN the backhaul link (DeNB-RN) and access link (RN-UE) operates on the same carrier frequency and are multiplexed in time domain. In LTE-A also Type 1a and Type 1b have been defined, the former assumes that backhaul and access links are on different carrier frequency while the later it assumes that enough isolation is available between the access and the backhaul links so they can operate on the same carrier frequency without loop interference. In the following description, it is assumed that RNs belong to Type 1 and or Type 1a and or Type 1b, i.e. any type of L3 relays.

Within LTE and LTE-A, cells are identified globally by the ECGI (E-UTRAN Cell Global Identifier). In order to achieve global uniqueness the ECGI is constructed as a combination of two information elements, namely from the cell's Cell Identity (CI) and the operator's PLMN (Public Land Mobile Network) identity to which the cell belongs to. The included PLMN ID must be the one given by the first PLMN entry in SIB1. Furthermore each eNB gets assigned a Global eNB ID (identity). Again, in order to achieve global uniqueness an eNB ID, which is unique only within a PLMN, is combined with the operators PLMN ID (identity) to which the eNB belongs to. This PLMN ID must be the same one as included in the ECGI. The eNB ID which is used to identify eNBs within a PLMN is also contained in the Cell Identity (CI) of the ECGI. The eNB ID for macro eNBs is a 20 Bits bit string and is equal to the 20 leftmost bits of the Cell Identity of the ECGI while the Cell Identity is a 28 Bits bit string.

Considering the dependencies between these IDs it can be seen that a macro eNB, once having got assigned a global eNB ID, can in theory assign the ECGIs of its cells under its own responsibility just by appending a 8 Bit number as 8 Bits bit string to the leftmost 20 Bits bit string which are obliged to be the eNB ID contained in the global eNB ID. This 8 Bit number uniquely identifies the cells within the eNB which corresponds to the maximum number of 256 cells that can be served by an eNB. Alternatively the ECGI can be configured by the OAM (Operations, Administration, and Maintenance) system and downloaded to the eNB using the management plane communication. In the case above dependencies must be considered by the OAM system. Even though RNs are independent nodes, the cells that they serve will appear as cells served by the macro eNB (also known as Donor eNB (DeNB)) which controls the macro cell in which the RNs are located. Consequently in this relay architecture the DeNB acts like a proxy for both S1 and X2 signalling and effectively hides the RN from the core network (CN). Thus, the DeNB and the RNs connected to it, have the same eNB ID.

In the current agreed architecture RN OAM and DeNB OAM systems are different and it is assumed that they can communicate with each other, even via NMS (Network Management System), if the information exchange between OAM systems needs to be minimised.

In order to avoid that RN cells have the same ECGIs of the DeNB cells, the ECGIs of RN cells have to be determined in such a way that they can be distinguished from that of the cells of the DeNBs. In the event that the DeNB determines the ECGIs of the RN cells it needs to inform the RNs about the selected ECGIs using C-Plane communication. For this communication, S1AP (S1 Application Part) and RRC (Radio Resource Control) protocols could be considered as being the most suitable.

However, on the one hand, using S1AP protocols to transfer the ECGI over the Un interface between the DeNB and the RN, the S1AP messages would require a new information element to be introduced in an existing message, e.g. within the S1 Setup Request or Response message, in order to convey the ECGI information. This has the drawback, that such a change will impact also the S1 interface between eNBs and MMEs (Mobility Management Entities), because the same S1AP is used between eNBs and MMEs as well as between DeNBs and their RNs. On the other hand, RRC signalling over the Un interface is not likely used to configure a parameter of the RN Uu interface and any changes to the signalling in order to accommodate ECGI information would have a large impact on RRC protocols.

A need therefore exists that can provide identity information to RN cells without incurring a large impact on current interfaces and protocols, in relay enhanced mobile telecommunication networks. This need may be met by the subject matter according to the independent claims. Advantageous embodiments of the present invention are described by the dependent claims.

According to the independent method claim, an identifier for a relay node in a communications network is provided by an access node checking data fields comprised in a message received from the relay node requesting an establishment of an interface connection over a communication link, generating the identifier, and upon generating the identifier, the access node transmitting the identifier to the relay node over the interface connection of communication link.

According to the independent apparatus claim, an access node, in a communications network, has means that are arranged for providing an identifier for a relay node wherein, receiver means are arranged to receive a message from the relay node, the message requesting an establishment of an interface connection over a communication link, checking means are arranged to check data fields comprised in the message received, generating means are arranged to generate the identifier, and transmitting means are arranged to transmit the generated identifier to the relay node over the interface connection of communication link.

In a further refinement of the invention, the message received is an X2 SETUP REQUEST message and the message transmitted after the generation of the identifier is an X2 SETUP RESPONSE message. In this way, existing messages can be used to transfer information which comprises the data fields of ECGI, PCI and EARFCN, using the X2 Application Protocol (X2AP) thus avoiding the need to define new messages and avoiding compatibility problems with older types of eNBs. Furthermore, the data field of the identifier that is checked is related to a Served Cells list or to a Neighbour Information list and the data field can be empty or comprise of a dummy value or any value. In addition, the generated identifier is an ECGI identifier. In a further refinement of the invention, the generated identifier is also communicated to the access node OAM system by the access node and to the relay node OAM system by the relay node.

The aspects defined above and further aspects of the present invention are apparent from the examples of embodiments to be described hereinafter and are explained with reference to the examples of embodiments. The invention will be described in more detail hereinafter with reference to examples of embodiments but to which the invention is not limited.

BRIEF DESCRIPTION OF THE DRAWINGS

The present invention may be understood more readily, and various other aspects and features of the invention may become apparent from consideration of the following description and accompanying figures which are given by way of illustration only, and thus are not limitative of the present invention, and wherein.

DETAILED DESCRIPTION

Figure 1:
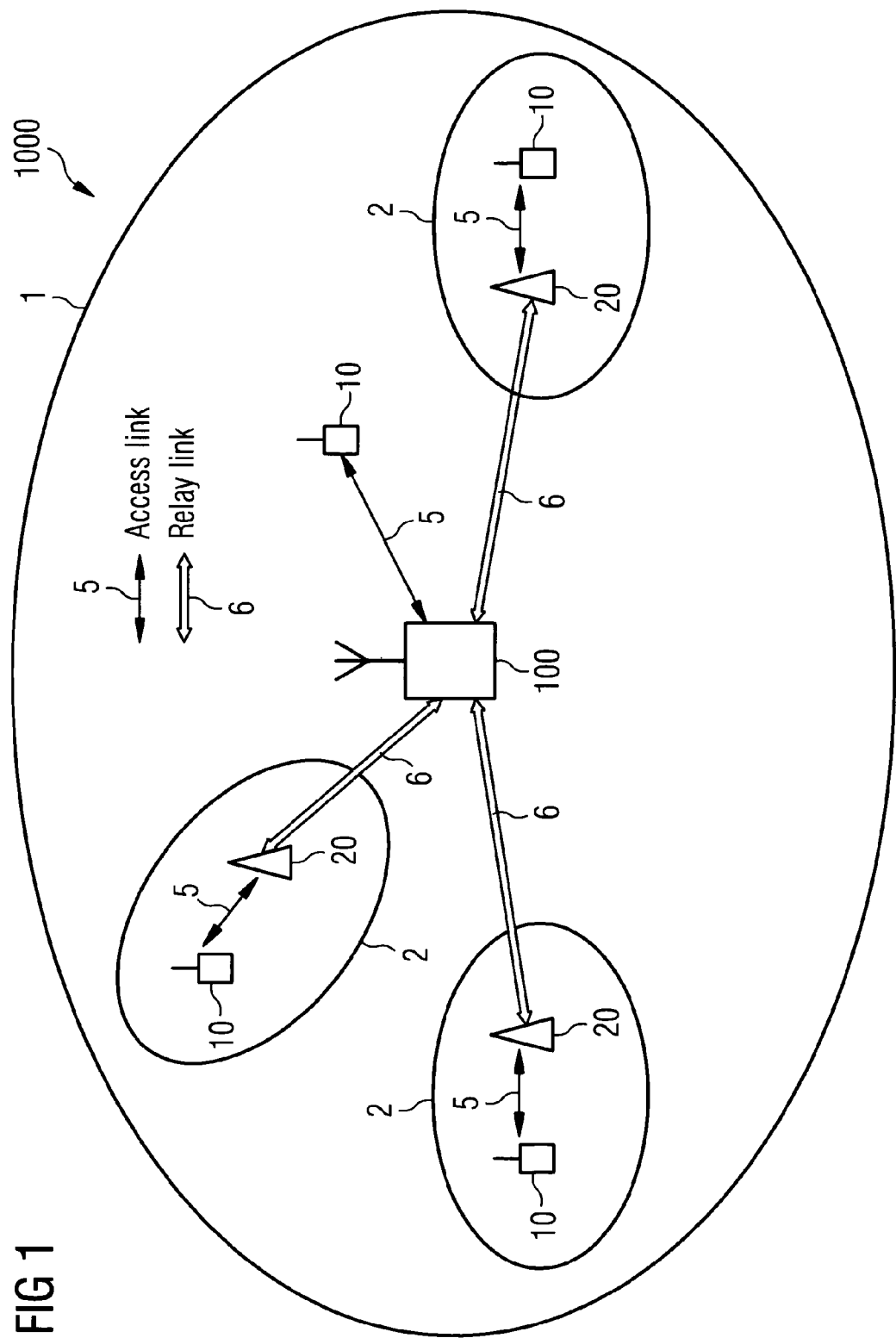
FIG. 1 shows a typical deployment of RNs in a cell of a communications network.

FIG. 1 shows a typical deployment of RNs in a cell 1 of a communications network 1000. In order to aid the understanding of the proposed invention only one exemplary cell 1 has been depicted. It is of course well known that in communications network 1000 where numerous UEs can be present, more than one cell 1 will exist. Communications network 1000 comprises an access node 100 providing coverage in cell 1 and access to a core network (CN) which is not illustrated. Within cell 1, RNs 20 are also present and allow for the coverage of cell 1 to be extended via the creation of RN cells 2. UEs 10 that are present within cell 1 can either be connected directly to access node 100 over an access link 5 or be connected to an RN 20 also over an access link 5. RNs 20 are in turn connected to access node 100 over a communication link 6 namely a relay link or equivalently in the case of a L3 type of relay this is also named a backhaul link.

Communications network 1000, can be an LTE or an LTE-A network. RNs 20, as indicated herein above are Type 1 relays or any type of L3 relays. Access node 100 can be at least one of the following: a base station, a nodeB, an e-nodeB (eNB), a Donor eNB (DeNB), while UE 10 can be at least one of the following: a mobile communication apparatus, a portable computer, a mobile phone.

Figure 2:
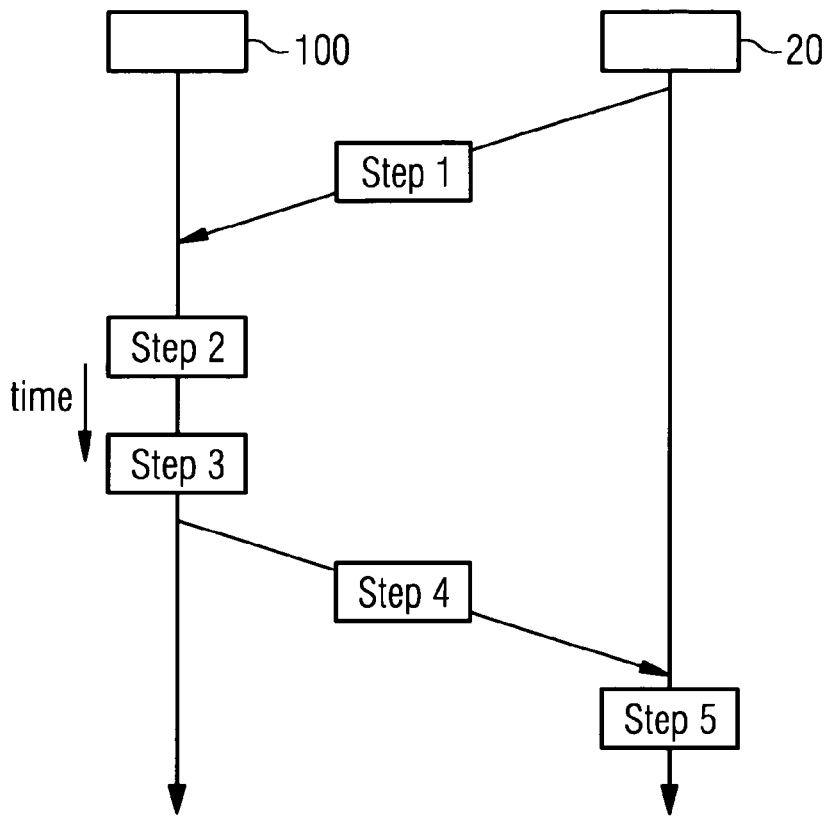
FIG. 2 shows a schematic message flow diagram depicting the sequence of steps performed by the invention.

FIG. 2 is a schematic message flow diagram depicting the sequence of steps performed according to an embodiment of the invention.

Initially (step 1), a RN 20 that is attaching itself to cell 1 transmits a message to access node 100 requesting the establishment of an interface connection over a communication link 6 with the access node 100. Communication link 6 being the backhaul link that allows access node 100 and RN 20 to communicate with each other. The message transmitted is an X2 SETUP REQUEST message requesting the establishment of an X2 interface. The X2 SETUP REQUEST message comprises information contained in different data fields. The data fields comprising the PCI (Physical Cell Identifier) and EARFCN (Evolved Absolute Radio Frequency Channel Number) values relating to the Served Cells list of the X2 SETUP REQUEST message are included by the RN 20, they are known by RN 20 because they are configured by the OAM (Operation, Administration and Maintenance). The data field containing the ECGI value relating to the Served Cells list of the X2 SETUP REQUEST message is left empty by RN 20, as it does not have an own ECGI. Alternatively, the data fields relating to Neighbour Information list can be used because it contains the related triple PCI, EARFCN and ECGI. Alternatively, in a further refinement of the invention, a dummy value can be inserted into the above mentioned fields instead of leaving them empty. Alternative, in a further refinement of the invention, any value can be inserted into the above mentioned fields instead of leaving them empty or inserting dummy values because the access node 100 is aware if the RN 20 has an assigned ECGI or not and can eventually ignore the received value in case the RN 20 does not have an ECGI assigned. The RN 20 includes in the Served Cells list an entry for each cell it needs to require the ECGI assignment from the access node 100.

In a next step (step 2), access node 100 upon receiving the X2 SETUP REQUEST message will check data fields relating to either the Served Cells list or to the Neighbour Information list. As the message received is a setup request message from a RN 20, access node 100 is immediately aware that an ECGI needs to be generated for the requesting RN 20, because the access node 100 knows if a ECGI has been already assigned or not to that cell of the RN identified by PCI and EARFCN values.

In a further step (step 3), access node 100 will generate the ECGI for RN 20 by combining the PLMN ID and the CI. The CI is 28 bits long and the first 20 bits is the identity of access node 100, i.e. the last 8 bits are assigned by the access node 100 to differentiate its cells. These 8 bits can be assigned in a random or sequential manner or other manner depending on the particular implementation used in access node 100 or from a rule configured by OAM. Whichever manner is used, access node 100 ensures that it does not assign the same bits (i.e. the same ECGI) to more than one cell. This can be done by, for example, access node 100 keeping an up-to-date list wherein all active ECGIs are stored and checking that the generated ECGI is not one that exists already in the list.

In a next step (step 4), upon generating the identifier, access node 100 transmits the identifier to the RN 20 over the interface connection of communication link 6. The identifier is transmitted using a further message over the X2 interface, the message being an X2 SETUP RESPONSE message. Access node 100, after copying the Served Cells list or the Neighbour Information list from the received X2 SETUP REQUEST message (in particular the PCI and EARFCN fields) into the X2 SETUP RESPONSE message, inserts the determined identifier into the field corresponding to the ECGI of the X2 SETUP RESPONSE message.

Finally, (step 5), the RN 20 receiving the X2 SETUP RESPONSE message will recognize from the PCI and EARFCN (Evolved Absolute Radio Frequency Channel Number) fields that the information comprised therein provides the ECGI that has been generated by access node 100. The ECGI field that is used to for inserting the identifier can be the one used in the Served Cells list or in the Neighbour Information list transmitted in the X2 SETUP RESPONSE message because both lists are capable to transfer related triples consisting of ECGI, PCI and EARFCN.

The same procedure can be applied in the case it is the access node 100 that starts the X2 setup with the RN, it can include the assigned ECGI in the X2 SETUP REQUEST of the corresponding RN cell 2 in the Served Cell list or in the Neighbour Information list. The RN 20 will reply with the X2 SETUP RESPONSE using the assigned ECGI in the Served Cell to confirm the assignment. In this case, there is no copying from the Served Cells list or Neighbour Information list, comprised in the received messages, into the response message because the X2 setup is started from access node 100. Therefore, the X2 SETUP REQUEST is sent instead of the X2 SETUP RESPONSE to communicate the selected ECGI to RN 20. In this case the access node 100 sets at least one of the corresponding PCI, EARFCN values of the corresponding list element containing the related triple ECGI, PCI, EARFCN to a value that is known to the RN 20. This dummy value or values is/are known to the RN as being used for providing the indication that this list element contains the ECGI of RN 20. For example the value '0' could be used for PCI and/or EARFCN to indicate that this list element contains a ECGI for the RN 20.

In an alternative embodiment when the X2 interface is already set-up and the RN 20 has a new cell, the eNB CONFIGURATION UPDATE procedure can be used instead of the X2 SETUP REQUEST because this message also transfers the same lists (i.e. the Served Cells list or the Neighbour Information list) as in the X2 SETUP REQUEST, which comprise the related information triples consisting of ECGI, PCI and EARFCN. Accordingly, the same principle can be applied for the eNB CONFIGURATION UPDATE procedure, when the RN 20 requires the assignment of an ECGI for the new cell. In this case, when the access node 100 receives an eNB CONFIGURATION UPDATE message, it will generate the ECGI for RN 20. Upon generating the identifier, access node 100 transmits the identifier to the RN 20 over the interface connection of communication link 6 using an eNB CONFIGURATION UPDATE message. Access node 100, after copying the Served Cells to Add/Modify list or the Neighbour Information list from the received eNB CONFIGURATION UPDATE message (in particular the PCI and EARFCN fields) into the eNB CONFIGURATION UPDATE message that has to be sent to the RN 20, inserts the determined identifier into the field corresponding to the ECGI of the eNB CONFIGURATION UPDATE message In an alternative embodiment when the X2 interface is already set-up, and the access node 100 for a particular network reason wishes to modify/change an existing ECGI, the eNB CONFIGURATION UPDATE procedure can be used instead of the X2 SETUP procedure because this message also transfers the same lists (i.e. the Served Cells list or the Neighbour Information list) as in the X2 SETUP procedure, which comprise the related information triples consisting of ECGI, PCI and EARFCN. Accordingly, the same principle can be applied for the eNB Configuration Update procedure, e.g. when access node 100 for any reason wants to change the assigned ECGI(s) of a RN 20. In this case, when a RN 20 receives an eNB CONFIGURATION UPDATE message and recognizes its own ECGI in the Served Cells to Modify list then it accepts the ECGI in the Neighbour Information list as the new ECGI of the corresponding cell 2.

Figure 3:
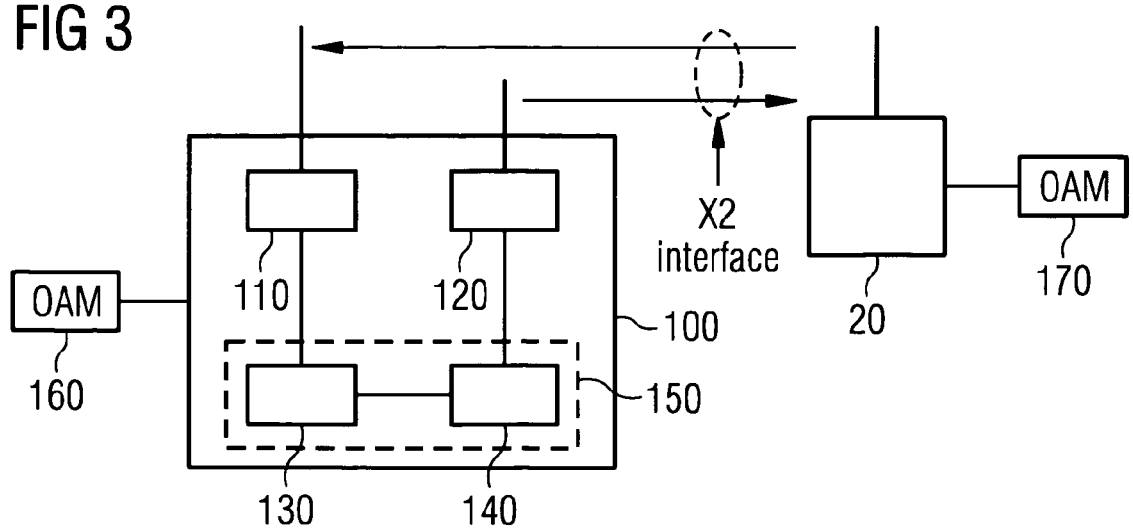
FIG. 3 shows a schematic representation of an access node 100 wherein the invention is implemented.

FIG. 3 shows a schematic block representation of an access node 100 within communications network 1000 wherein the invention can be implemented and the steps of the described method executed. Access node 100 provides coverage for a cell 1 and can be at least one of the following: a base station, a nodeB, an e-nodeB (eNB), a Donor eNB (DeNB). It is noted that the block structure shown, could be implemented by a person skilled in the art in various ways, e.g., by providing various physical units which can be implemented in both hardware and/or software.

Access node 100, in communications network 1000 has means that are arranged for providing an identifier for a relay node 20. These comprise receiver means 110 arranged to receive a message from the RN 20, the message requesting an establishment of an interface over communication link 6. The received message requesting an establishment of an interface connection over a communication link 6 between the access node 100 and RN 20 is an X2 SETUP REQUEST message requesting the establishment of a X2 interface. Checking means 130 that are arranged to check data fields comprised in the message received. Generating means 140 arranged to generate the identifier and transmitting means 120 arranged to transmit the generated identifier to the RN 20 over the interface connection of communication link 6. Checking means 130 and generating means 140 are shown as separated entities however, in an alternative embodiment they can be implemented together in one unit 150. The generating means 140 might also reside in the OAM, in this case the access node 100 generates the identifier for RN 20 with the collaboration of the OAM. Access node 100, is further arranged to establish the interface connection to RN 20 over communication link 6, upon the reception of the X2 SETUP REQUEST message. The identifier generated from the access node 100 and provided to the RN 20 is also communicated to the access node OAM system 160 by access node 100 and to the OAM system 170 of the RN 20 by RN 20.

The X2 SETUP REQUEST message comprises information contained in different fields. The data fields containing the PCI (Physical Cell Identifier) and EARFCN (Evolved Absolute Radio Frequency Channel Number) values relating to the Served Cells list of the X2 SETUP REQUEST message are included by the RN 20, they are known from the RN 20 because configured by the OAM. The field relating to the ECGI in the Served Cells of the X2 SETUP REQUEST message is left empty by RN 20, as it does not have an own ECGI. Alternatively, the data fields relating to Neighbour Information list can be used because it contains the related triple PCI, EARFCN and ECGI. Alternatively, in a further refinement of the invention, a dummy value can be inserted into the above mentioned fields instead of leaving them empty. Alternatively, in a further refinement of the invention, any value can be inserted into the above mentioned fields instead of leaving them empty or inserting dummy value.

The generating means 140 are further arranged to generate an ECGI identifier by combining the PLMN ID and the CI. The CI is 28 bits long and the first 20 bits form the identity of access node 100, i.e. the last 8 bits are assigned by access node 100 to differentiate its cells. Transmitter means 120 are further arranged to transmit the identifier transmitted using a further message, the message being an X2 SETUP RESPONSE message, wherein, after copying the Served Cells list or the Neighbour Information list into the X2 SETUP RESPONSE message (in particular the PCI and EARFCN fields), the identifier is inserted into the field corresponding to the ECGI of the X2 SETUP RESPONSE message. The ECGI field that is used to for inserting the identifier can be the one used in the Served Cells list or in the Neighbour Information list transmitted in the X2 SETUP RESPONSE message because both lists are capable of transferring related triples consisting of ECGI, PCI and EARFCN.

RN 20 has means that are arranged to transmit and receive messages from access node 100 and upon receiving the X2 SETUP RESPONSE message will recognize from the PCI and EARFCN fields that the information comprised therein provides the ECGI that has been generated by access node 100. As mentioned herein above communications network 1000 can be a Long Term Evolution network or a Long Term Evolution Advanced network.

In a further refinement of the invention, the invention can be implemented in a computer program for providing an identifier for a RN 20. The computer program, when being executed by a data processor of an access node 100, is adapted for executing the above described method. The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions.

It has to be noted that embodiments of the invention have been described with reference to different subject matters. In particular, some embodiments have been described with reference to method type claims whereas other embodiments have been described with reference to apparatus type claims. However, a person skilled in the art will gather from the above, unless otherwise notified, in addition to any combination of features belonging to one type of subject matter also any combination between features relating to different subject matters, in particular between features of the method type claims and features of the apparatus type claims is considered as to be disclosed with this application. A person skilled in the art will appreciate other embodiments and modifications which can be made without departing from the scope of the teachings of the invention. All such modifications are intended to be included within the scope of the claims appended hereto.

The invention claimed is:

1. A method for providing an identifier for a relay node in a communications network comprising the steps of:
   checking by an access node data fields comprised in an X2 SETUP REQUEST message received from the relay node requesting an establishment of an interface connection over a communication link, wherein the data fields are related to a Served Cells list or to a Neighbour Information list and the relay node serves at least one cell;
   generating an E-UTRAN Global Cell Identifier (ECGI), and
   upon generating the identifier, the access node transmitting the identifier to the relay node over the interface connection.

2. The method according to claim 1, wherein the data field is empty or comprises a dummy value.

3. The method according to claim 1, wherein the identifier is transmitted to the relay node using an X2 SETUP RESPONSE message.

4. An access node comprising:
   at least one data processor; and
   at least one memory storing computer readable instructions;
   wherein the at least one data processor is configured with the at least one memory and the instructions to cause the access node to at least:
   receive an X2 SETUP REQUEST message from a relay node serving at least one cell, the message requesting an establishment of an interface connection over a communication link;
   check data fields comprised in the received message, wherein the data fields are related to a Served Cells list or to a Neighbour Information list;
   an E-UTRAN Global Cell Identifier (ECGI), and
   transmit the generated identifier to the relay node over the interface connection.

5. The access node according to claim 4, wherein the generated identifier is transmitted to the relay node using an X2 SETUP RESPONSE message.

6. The access node according to claim 4, wherein the access node is at least one of the following: a base station, a radio access controller, a nodeB, an enodeB, a Donor-enodeB.

7. A communications network comprising at least one access node according to claim 4.

8. The communications network according to claim 7, wherein the communications network is a Long Term Evolution network or a Long Term Evolution Advanced network.

9. The access node according to claim 4, wherein the data field is empty or comprises a dummy value.

10. The method according to claim 1, wherein the access node is at least one of the following: a base station, a radio access controller, a nodeB, an enodeB, a Donor-enodeB.

11. The method according to claim 1, wherein the communications network is a Long Term Evolution network or a Long Term Evolution Advanced network.

12. A memory storing computer-readable instructions that, when executed by one or more processors, causes an access node in a communications network to at least:
- check data fields comprised in an X2 SETUP REQUEST message received from a relay node requesting an establishment of an interface connection over a communication link, wherein the data fields are related to a Served Cells list or to a Neighbour Information list and the relay node serves at least one cell;
- based on the checking, generate an E-UTRAN Global Cell Identifier (ECGI), and
- upon generating the identifier, transmit the identifier to the relay node over the interface connection.

13. The memory according to claim 12, wherein the data field is empty or comprises a dummy value.

14. The memory according to claim 12, wherein the identifier is transmitted to the relay node using an X2 SETUP RESPONSE message.

15. The memory according to claim 12, wherein the access node is at least one of the following: a base station, a radio access controller, a nodeB, an enodeB, a Donor-enodeB.

16. The memory according to claim 12, wherein the communications network is a Long Term Evolution network or a Long Term Evolution Advanced network.

* * * * *

UNITED STATES PATENT AND TRADEMARK OFFICE
CERTIFICATE OF CORRECTION

| | | |
|---|---|---|
| PATENT NO. | : 9,179,326 B2 | Page 1 of 1 |
| APPLICATION NO. | : 13/877953 | |
| DATED | : November 3, 2015 | |
| INVENTOR(S) | : Redana et al. | |

It is certified that error appears in the above-identified patent and that said Letters Patent is hereby corrected as shown below:

IN THE CLAIMS
Claim 5, col. 8, line 46 --generate-- should be inserted in front of "an".

Signed and Sealed this
Second Day of February, 2016

Michelle K. Lee
*Director of the United States Patent and Trademark Office*